United States Patent [19]

Matsuda

[11] Patent Number: 5,016,498
[45] Date of Patent: May 21, 1991

[54] METHOD AND APPARATUS FOR MANUFACTURING SUPER ABRASIVE CUTTING SAW

[75] Inventor: Yusaku Matsuda, Osaka, Japan

[73] Assignee: Sanwa Diamond Industrial Co., Ltd., Japan

[21] Appl. No.: 91,011

[22] Filed: Aug. 28, 1987

[30] Foreign Application Priority Data

May 30, 1987 [JP] Japan .................. 62-137212

[51] Int. Cl.⁵ .................. B23D 63/00; B29C 33/42
[52] U.S. Cl. .................. 76/25.1; 264/273; 264/274
[58] Field of Search .................. 76/25 R; 125/15; 51/206 R; 264/56, 57, 66, 259, 271.1, 273, 274

[56] References Cited

U.S. PATENT DOCUMENTS

| | | | |
|---|---|---|---|
| 2,405,086 | 7/1946 | Bevillard | 51/206 R |
| 2,811,960 | 11/1957 | Fessel | 125/15 |
| 3,009,456 | 11/1961 | Fessel | 125/15 |
| 3,049,843 | 8/1962 | Christensen | 125/15 |
| 3,162,187 | 12/1962 | Christensen | 125/15 |
| 4,067,311 | 1/1978 | Benetello | 125/15 |
| 4,267,814 | 5/1981 | Benson et al. | 125/15 |
| 4,291,667 | 9/1981 | Eichenlaub et al. | 125/15 |
| 4,461,268 | 7/1984 | Inoue | 125/15 |
| 4,637,370 | 1/1987 | Ishizuka | 125/15 |
| 4,665,887 | 5/1987 | Shiga | 125/15 |
| 4,705,017 | 11/1987 | Lewis | 125/15 |

Primary Examiner—Roscoe V. Parker
Attorney, Agent, or Firm—Ostrolenk, Faber, Gerb & Soffen

[57] ABSTRACT

In the method for manufacturing a super abrasive cutting saw, press molds are formed with uneven portions on the main opposite surfaces. The molds define a space portion for containing the periphery of a cutting saw plate. Two masses of compressed sinterable powders are prepared. The two masses of compressed powder are brought to oppose each other while holding the periphery of the cutting saw plate therebetween for engagement. The press molds are engaged to press and hold the masses. Heating the compressed powder to sinter while pressing the same fuses the two masses of compressed powder together and to the cutting saw plate and forms a sinter around the periphery of the cutting saw plate. An apparatus used in the method of manufacturing the super abrasive cutting saw includes the space portion for containing at least the periphery of the cutting saw plate and the pressed powder. The molds defining the space portion are formed with uneven portions on their main surfaces for engaging to the main surfaces of the compressed powder sinter and forming corrugations therein.

5 Claims, 3 Drawing Sheets

A      B      C      D      E

F      G      H      I      J

METHOD AND APPARATUS FOR MANUFACTURING SUPER ABRASIVE CUTTING SAW

BACKGROUND OF THE INVENTION

1. Field of the Invention

The present invention relates to a method and apparatus for manufacturing a super abrasive cutting saw and, more particularly, to the method and apparatus for manufacturing a diamond cutting saw or a CBN cutting saw made by sintering a pressed powder including super abrasives such as fine diamond abrasives, cubic born nitride and the like around the periphery of an orbicular cutting saw plate.

2. Description of the Prior Art

Known methods for manufacturing such type of diamond cutting saw are the following method.

The first method is to press a powder including fine diamond abrasives together to form a moss of pressed powder into a prescribed shape in advance after forming two pressed powder masses having a same shape, a steel plate to be formed into a cutting saw plate is inserted between the two pressed powder masses in a mold and sintered. According to this method, a seam defined between the two pressed powder masses is flat and the outer surfaces of the masses are also formed substantially with a flat sinter.

The other method is to form a sheet of pressed powder into a prescribed shape with the powder including fine diamond abrasives in advance, which is sintered and at the same time, sintering the cutting saw plate by intruding it into the sintered portion formed by sintering the pressed powder sheet with its thermal expansion, and simultaneously fusing the sintered portion onto the cutting saw plate.

The first method, when forming each pressed powder mass, requires preparing each orbicular pressed powder mass having a flat surface and the masses are joined together to form a diamond layer with the two pressed powders masses by sintering. This causes some portions in a border between the two opposing pressed powder masses to be lacking diamond abrasives.

In the second method, such disadvantage of the first method is removed by forming a sheet of pressed powder in advance, since the larger the diameter and higher the temperature the larger the magnitude of intrusion of the cutting saw plate into the sintered portion with its thermal expansion. But the second method is unsuitable for manufacturing a relatively smaller cutting saw or when using a powder having a low sintering temperature. Also, the bonding strength between the sintered diamond and the cutting saw plate is relatively weaker so the latter diamond cutting saw is unsuitable as a cutting saw for use under severe conditions.

SUMMARY OF THE INVENTION

A primary object of the present invention is, therefore, to provide a method and apparatus for manufacturing a super abrasive cutting saw, so that the supper abrasive cutting saw will have super abrasives located in all portions of the sinter and will maintaining a good sharpness continuously without being worn locally and unevenly. Another object is to be able to manufacture the saw in a large quantity in separate processes, while simplifying the apparatus due to a comparatively small number of molds, and at the same time, it is possible to manufacture the comparatively small cutting saws and to use powders having a low sintering temperature.

The first invention is a method for manufacturing the super abrasive cutting saw. The pressed powder which is formed with the powder including super abrasives is prepared by being and divided into two portions. There is a process for preparing the cutting saw plate. There is a process for preparing the press molds including the space portion for containing at least the periphery of the cutting saw plate and the masses of pressed powders. On the main surfaces of the mold in the space portions, which surfaces engage the main surfaces of the pressed powder masses uneven portions are formed. The periphery of the cutting saw plate is located in the space portion of the press molds. At the same time, the two pressed powder masses are placed in opposition so for to be fused together as holding the periphery of the cutting saw plate and for engaging the other press mold so as to be pressed and held. The pressed powder masses are heated they are pressed to sinter as fusing the two pressed powder masses together and bonding them to the cutting saw plate to form the sinter on the periphery of the saw plate.

The second invention is the apparatus for manufacturing the super abrasive cutting saw in which the pressed powder masses formed with a powder including super abrasives and divided into two pieces are heated and sintered while being pressed. The two sheets of pressed powder masses are fused together and bonded to the cutting saw plate to form the sinter around the periphery of the plate. The press molds include space portions each for containing at least the periphery of the cutting saw plate and the pressed powders. The space portions of the molds are formed with uneven portions on the main surfaces thereof engaging for the main surfaces of the pressed powders masses. The periphery of the cutting saw plate is located in the space portion of the press molds. At the same time, the two pressed powder masses are opposed to be fused together while they hold the periphery of the cutting saw plate, and the other press mold is then joined to be pressed and fixed.

Thus, according to the present invention, since the pressed powder divided into two masses is prepared with the powder including the super abrasives such as the fine diamond abrasives in advance, manufacturing processes can be separated and the super abrasive cutting saw such as the diamond cutting saw and the like can be manufactured in a large quantity. Also, since two pressed powder masses are prepared, the number of molds used at sintering can be comparatively reduced, preventing complication of the manufacturing molds.

In addition, the super abrasive cutting saw in accordance with the present invention is manufactured by preparing two formed pressed powder masses, fusing them together in the molds while holding the cutting saw plate therebetween for sintering, and bonding them also to the cutting saw plate. This is different from the conventional method in which the cutting saw plate is fused to the sinter with its thermal expansion. In the invention reliance on the thermal expansion coefficient of the cutting saw plate is not required. Thus, it is possible to manufacture the comparatively smaller cutting saws and to use powders having a lower sintering temperature.

BRIEF DESCRIPTION OF THE DRAWINGS

FIG. 1 through FIG. 3 show a diamond cutting saw manufactured by a method in accordance with the present invention, wherein FIG. 1 is a perspective view, FIG. 2 is a plan view of its essential portion and FIG. 3 is a vertical sectional view.

These objects and other objects, features, aspects and advantages of the present invention will become more apparent from the following detailed description of the embodiment of the present invention when taken in connection with the accompanying drawings.

DESCRIPTION OF THE PREFERRED EMBODIMENTS

Figure 1:
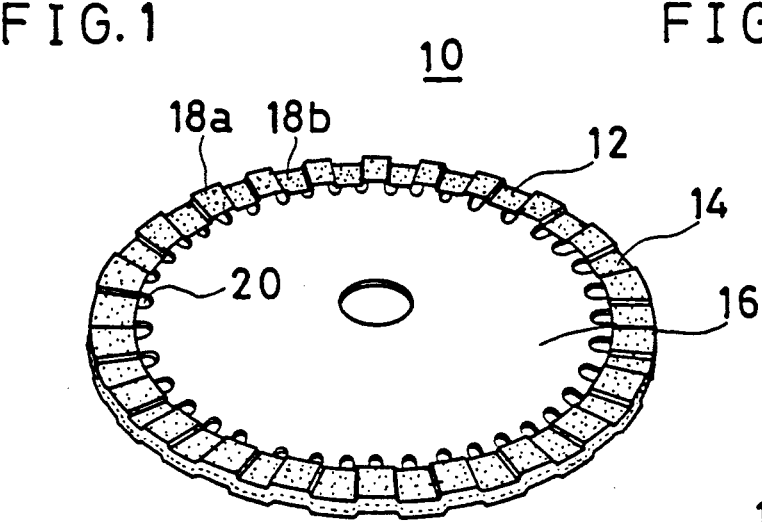
Figure 2:
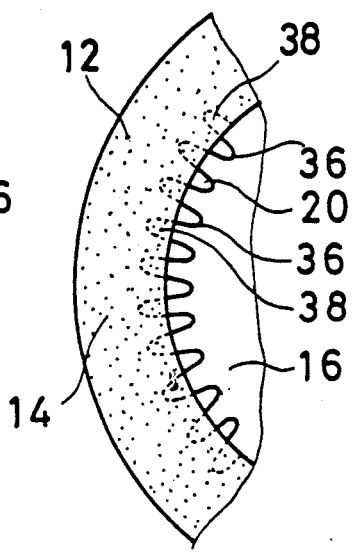
Figure 3:
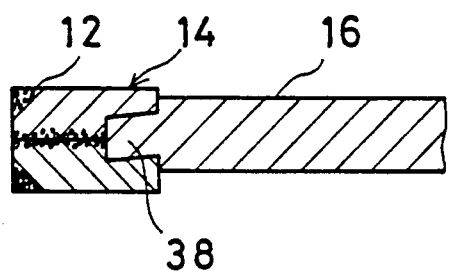
Figure 4:
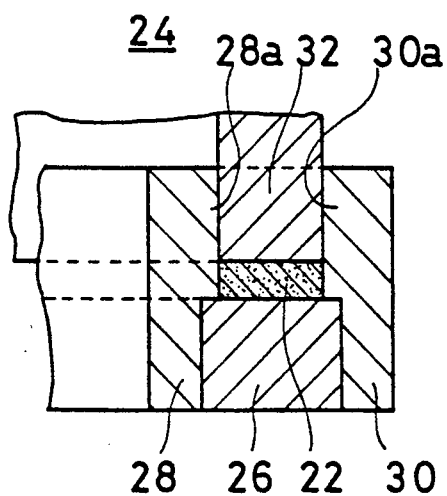
FIG. 4 is an illustrative view showing an example of an apparatus for preparing a pressed powder mass.

FIG. 1 is a perspective view of a diamond cutting saw manufactured in accordance with a method of one embodiment of the present invention, FIG. 2 is a plan view of its essential portion and FIG. 3 is a vertical sectional view thereof.

FIG. 4 through FIG. 8 show the manufacturing method in accordance with the present invention.

The diamond cutting saw 10 comprises a sinter 14 including super abrasives such as fine diamond abrasives 12 or the like and an orbicular cutting saw plate 16 supporting the sinter 14.

The sinter 14 including the diamond abrasives 12 are formed with concave and convex portions 18a and 18b on its opposite surfaces alternating thereby forming each surface in series and into a corrugated shape as a whole. Although the concave and convex portions 18a and 18b are formed to extend radially generally, parallel to the radial direction of the cutting saw plate 16, they may be formed to intersect the radii obliquely.

Through the cutting saw plate 16, suitably spaced cooling holes are opened in the vicinity of an inner periphery of the sinter 14.

Next, a method for manufacturing the diamond cutting saw 10 will be explained.

A metal powder of 30~50% copper, 30~50% iron and 5~10% tin including 1-50% fine diamond abrasives 12 of 20~400 meshes by volume is prepared and fed into an apparatus 24 for preparing a pressed powder. (refer to FIG. 4)

The apparatus 24 comprises an inner cylinder 28 and an outer cylinder 30 closely contacting inner and outer walls of an annular mold 26. The outer wall of the inner cylinder 28 and the inner wall of the outer cylinder 30 project in a stepped fashion above the upper surface of the mold 26, thereby forming an enlarged diameter portion 28a of the inner cylinder 28 and an elongated portion 30a of the outer cylinder 30.

Figure 5:
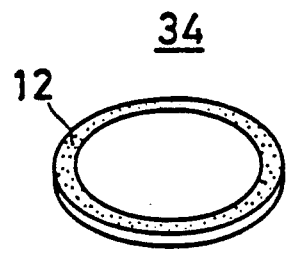
FIG. 5 is an illustrative view showing an example of the pressed powder mass.
Figure 6:
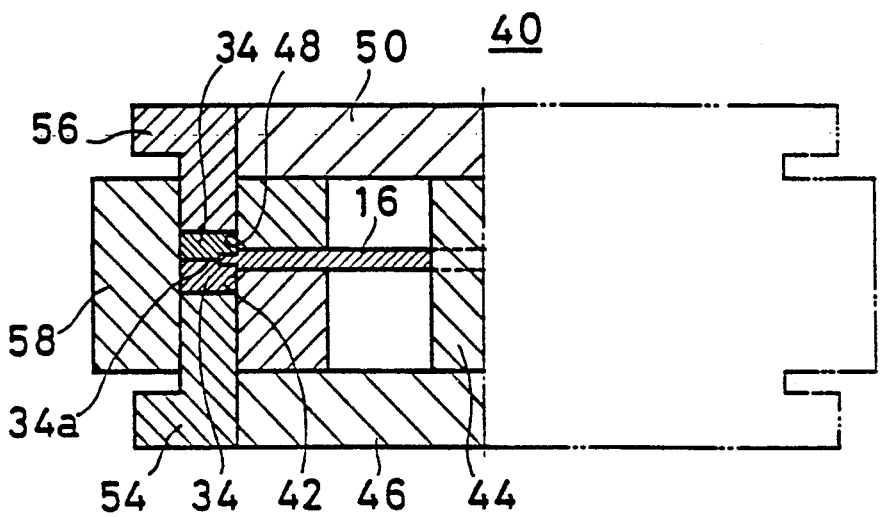
FIG. 6 is a sectional view showing an example of a press sintering apparatus.
Figure 7:
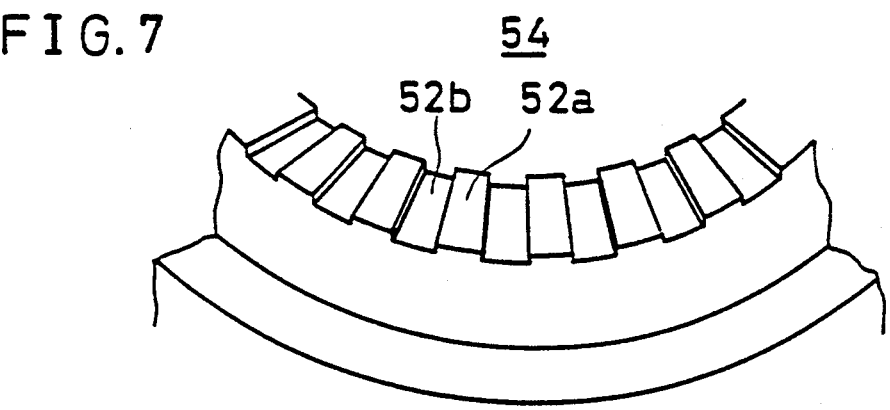
FIG. 7 is a perspective view showing an essential portion of a press mold.

Into the mold 26, various powders 22 including the fine diamond abrasives weighed by a fixed quantity with a prescribed calculation are fed. An annular press mold 32 is pressed and tightened from the upper side. As shown in FIG. 5, a pressed powder mass is formed 34 hardened into a density smaller than about 1 or 30% than that of a sintered alloy to be formed later.

The pressed powder mass 34 thus formed preparatively has an annular orbicular shape with generally flat surfaces.

As materials of the pressed powder 34, 30-50% nickel, 10-70% cobalt, 5-10% molybdenum and 5-10% tungsten may be further added by one or several methods besides those aforementioned.

Also, in place of the metal powders mentioned above, for example, synthetic resin powders such as a phenol resin, epoxy resin or polyimide resin or the like may be selectively used.

Besides, the powders forming the pressed powder mass 34 is uniformly filled and distributed in the apparatus 24. After the mass is formed by compressing and binding from the upper and lower sides with a press at the pressure of 1 ton/cm$^2$ or 5 ton/cm$^2$, it is taken out from the mold and formed.

Meanwhile, for the cutting saw plate 16, a thin disc of a simple substance of iron, copper and titanium or steel or an alloy such as those of copper and beryllium is used. Suitably spaced U-shaped concaves or recesses 36 are formed around its periphery. In the gearlike portions of the cutting saw plate 16 formed by the concaves 36, each convex or projection 38 may be slightly curved or bent, as shown in FIG. 3, the direction intersecting one surface of the cutting saw plate 16, with successive convexes 38 being bent mutually in the opposite direction.

Also, in the embodiment, the thickness of the convex 38 is made slightly thinner than the main body of the cutting saw plate 16. By this construction, a step is formed between the convex 38 and the main body of the cutting saw plate 16, retaining the strength of the cutting saw plate 16 as well as keeping the thickness of the sinter 14 thinner.

Next, the pressed powder means 34 and the cutting saw plate 16 are fed into a press sintering apparatus 40 prepared separately. (refer to FIG. 6)

The press sintering apparatus 40 has a cylindrical upward facing concave step 42 having a depth generally same as one-half of the height of the pressed powder mass 34. It includes a mold 46 having a convex shaft 44 in the center. There is an upper mold 50 having a downward faced concave step 48 symmetrical to the concave step 42 of the mold 46.

By the concave step 42 of the mold aforementioned or the mold 46 and the concave step 48 of the upper mold 50, a doughnut-shaped space portion for containing the pressed powder means 34 is formed. A convex portion 52a and a concave portion 52b are formed alternately on a press mold 54, while the same convex and concave portions as the press mold 54 are formed on an upper press mold 56, and the press mold 54 and the upper press mold 56 are contacted respectively to the peripheral walls of the mold 46 and the upper mold 50. Moreover, a cylindrical mold 58 is contacted to the peripheral walls of the press mold 54 and the upper press mold 56.

Into the convex shaft 44 projecting in the center of the mold 46, the cutting saw plate 16 is inserted, and the upper mold 50 containing another pressed powder means 34 in a prescribed portion of the concave step 48 is mounted so as to hold the pressed lower powder 34a previously contained in a receiving portion formed by the concave step 42 and the outer periphery of the cutting saw plate 16. The upper press mold 56 is then mounted so as to bring the convex portions 52a formed on the upper surface of the press mold 54 and the concave portions formed on the lower surface thereof to face each other.

Then, the pressed powder masses 34 are pressed from the lower surface of the press mold 54 and the upper surface of the upper press mold 56 by a press unit (not shown) at a prescribed pressure to fuse the pressed powder 34a contained in the press mold 54 and the pressed powder means 34 contained in the upper press mold 56 together.

In such pressurized condition, the cutting saw plate 16 and the pressed powder masses 34 are heated, for example, in an electric furnace in a hydrogen current or a similar atmosphere and are sintered into one body.

The one sintered pressed powder means 34 is formed by fusing the two pressed powder masses 34 together along with the cutting saw plate 16. Around the periphery of the cutting saw plate 16, the sinter 14 is bonded.

Figure 8:
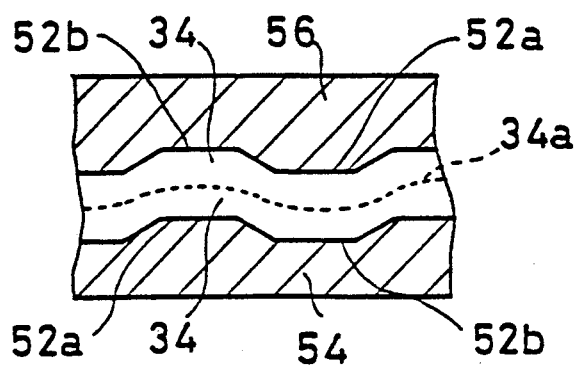
FIG. 8 is an illustrative view showing an essential portion of the molds of the press sintering apparatus and the pressed powders and FIG. 9 are illustrative views showing various examples of concave portions of a cutting saw plate.
Figure 9:
Figure 9:
Figure 9:
Figure 9:
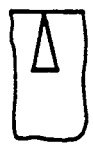
Figure 9:
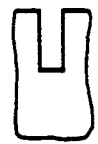
Figure 9:
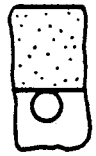
Figure 9:
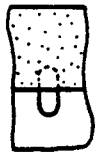
Figure 9:
Figure 9:
Figure 9:
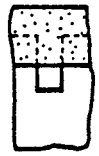

Corresponding to the convex portion 52a and concave portion 52b formed on the upper surface of the press mold 54 and the convex and concave portions formed on the lower surface of the upper mold 56, as shown in FIG. 8, the outer surfaces of the finished sinter are corrugated. A seam 34a between the two pressed powder masses 34 also extended in a zigzag fashion in the direction of thickness of the cutting saw plate 16 along the corrugated shape.

Therefore, when the diamond cutting saw 10 is rotated to cut a workpiece; the seam of the pressed powders 34 is never in a state to contact the workpiece continuously because the seam is not straight, and the fine diamond abrasives are present at all portions. Thus, the diamond cutting saw does not wear locally and unevenly.

Moreover, the irregularity formed by the concaves 36 and convexes 38 of the cutting saw plate 16, the bonding area of the cutting saw plate 16 and of the sinter 14 is widened and this increases the bonding strength. In addition, in the embodiment, since the holes 20 are formed in series near the sinter 14, even in the dry process, for example, used with a motor-driven grinder which is different from using water for cooling the sintered portion, air is stirred by the holes 20 so as to radiate heat generated during cutting into the air. Heat is hard to conduct into the core of the cutting saw plate 16 due to this cooling effect.

The molds 46 and 50 of the press sintering apparatus 40 are molded by carbon, conductive ceramics, ferrite, tungsten carbide and the like.

In the embodiment of diamond cutting saw, though the holes 20 are formed along the inner periphery of the sinter 14. In place of the holes 20, for example, the shape of concaves 36 formed around the periphery of the cutting saw plate 16 can be naturally suitably changed as shown in FIGS. 9A through 9J.

In place of the fine diamond abrasives, super abrasives such as cubic boron nitride (CBN) or the like may be selected.

Although the present invention has been described and illustrated in detail, it is clearly understood that the same is by way of illustration and example only and is not to taken by way of limitation, the spirit and scope of the present invention being limited only by the terms of the appended claims.

What is claimed is:

1. An apparatus for manufacturing a super abrasive cutting saw from pressed powder that is formed from a powder including super abrasives and respectively divided into two powder masses which are sintered and pressed together onto a cutting saw plate, forming a sinter around the periphery of the plate, the apparatus comprising:

cooperating press molds shaped for defining a doughnut-shaped space portion which is shaped for accommodating the entire periphery of the cutting saw plate and all of the two pressed powder masses, the molds together having main top and bottom, opposite, facing surfaces which are formed with uneven portions on the main surfaces for engaging the main surfaces of the pressed powder masses, the space portion being shaped and placed for the periphery of the cutting saw plate to be located in the space portion of the press molds, the molds being shaped for bringing the two pressed powder masses to oppose each other and to hold the periphery of the cutting saw plate for engagement, the press molds being engaged to be pressed together and fixed for sintering the masses onto the cutting saw plate, wherein the press molds comprise an upper mold and a lower mold, the space portion is formed between the molds, the uneven portions on each mold are formed with alternate concave and convex portions to form corrugations in the main surfaces of the sinter.

2. An apparatus for manufacturing a super abrasive cutting saw in accordance with claim 1, wherein the press molds are so shaped and mounted as to bring the concave portions formed on the upper mold to oppose the convex portions formed on the lower mold, and the molds are formed to press and fix the pressed powder masses and the cutting saw plate therewith.

3. The apparatus of claim 2, wherein the alternate concave and convex portions are formed to press and fix the pressed powder masses onto the periphery of the cutting saw plate while the periphery of the cutting saw plate is located directly between the alternate concave and convex portions.

4. An apparatus for manufacturing a super abrasive cutting saw in accordance with claim 1, wherein said molds are heatable for sintering.

5. An apparatus for manufacturing a super abrasive cutting saw in accordance with claim 1, wherein said molds are adapted to form a zig-zag seam between said two pressed powder masses.

* * * * *